May 30, 1939.   C. A. FLOOD   2,160,726
TAG
Filed June 1, 1936   2 Sheets-Sheet 1
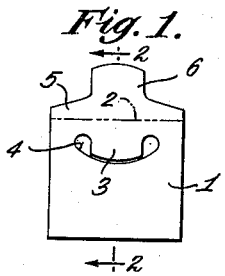
Fig. 1.
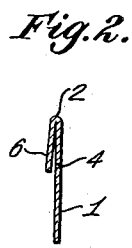
Fig. 2.
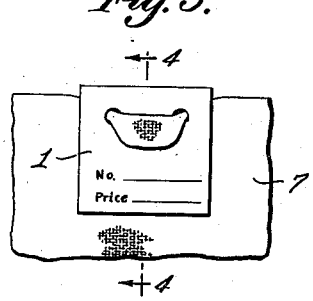
Fig. 3.
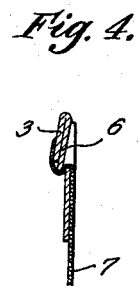
Fig. 4.
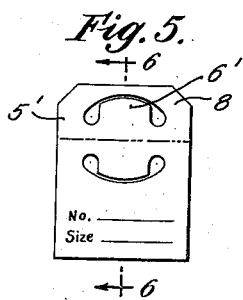
Fig. 5.
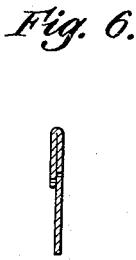
Fig. 6.
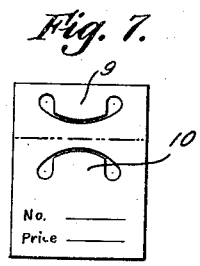
Fig. 7.
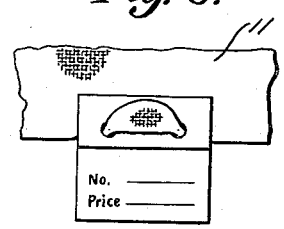
Fig. 8.
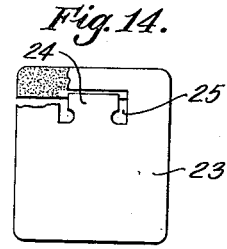
Fig. 10.
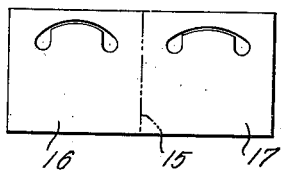
Fig. 9.
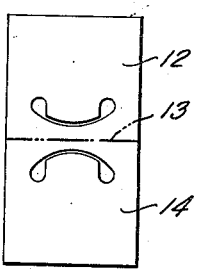
Fig. 12.
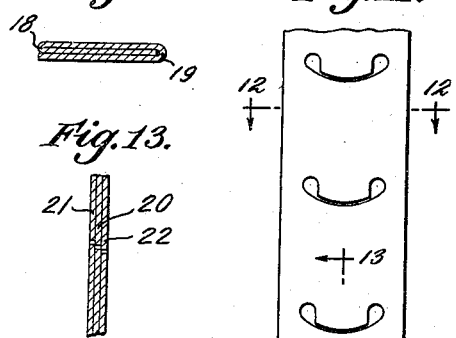
Fig. 11.
Fig. 13.
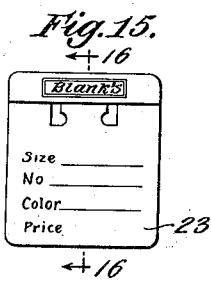
Fig. 14.
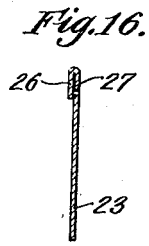
Fig. 15.
Fig. 16.
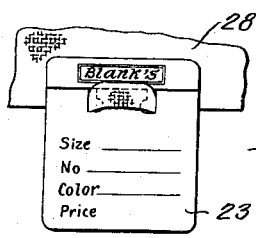
Fig. 17.
Inventor,
Carl A. Flood,
by Roberts, Cushman & Woodberry
Attys.

May 30, 1939.  C. A. FLOOD  2,160,726
TAG
Filed June 1, 1936  2 Sheets-Sheet 2
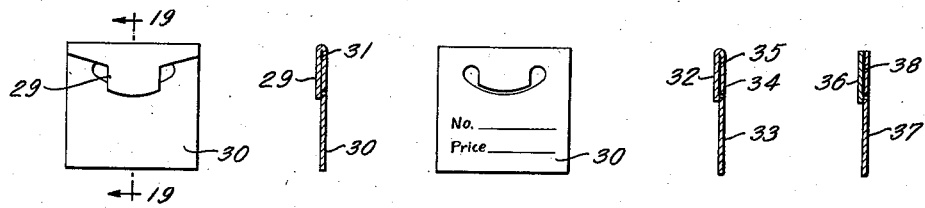
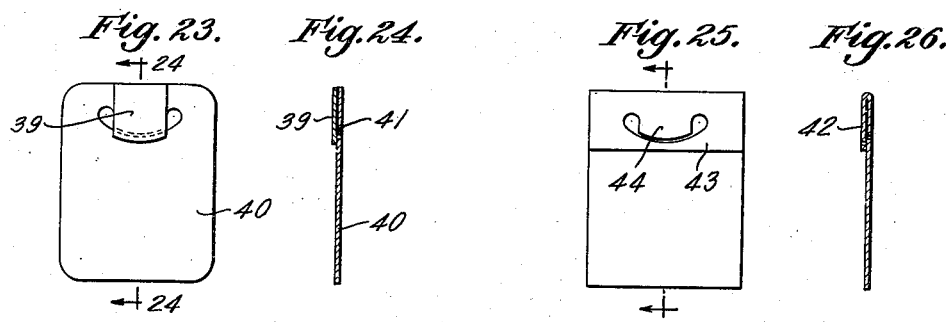
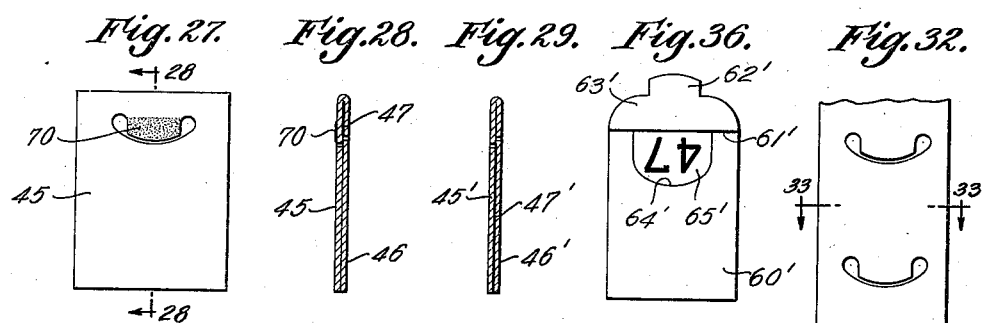
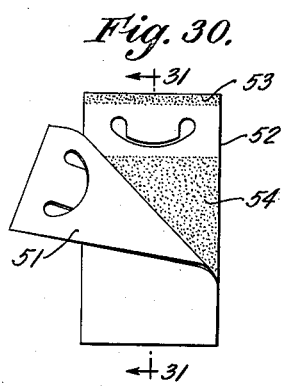
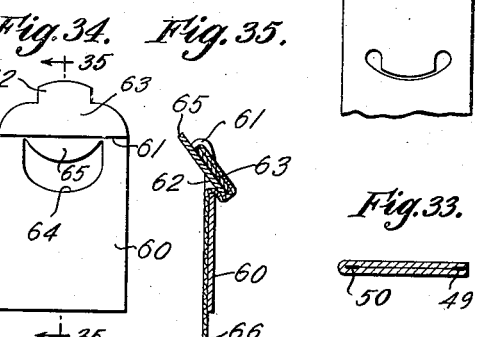
Inventor,
Carl A. Flood,
by Roberts, Cushman & Woodberry
Attys.

Patented May 30, 1939

2,160,726

UNITED STATES PATENT OFFICE 2,160,726

TAG

Carl A. Flood, Framingham, Mass., assignor to Dennison Manufacturing Company, Framingham, Mass., a corporation of Massachusetts Application June 1, 1936, Serial No. 82,737

6 Claims. (Cl. 40—20)

This invention relates to tags, such as price tickets, labels, etc., of the type in which attachment to fabric and the like is effected by direct interengagement with the fabric without the aid of pins, staples or the like.

Objects of the invention are to provide a tag which is simple and economical in construction, which can readily be applied by hand or by machine, which will not become detached accidentally but which can readily be detached by hand, and which will not damage delicate fabrics.

In one aspect the invention involves an integral tongue cut in the body of the tag inside the marginal outline thereof, in contradistinction to a tongue formed in an extension projecting beyond the marginal outline of the tag, in combination with a second tongue comprising an integral extension which may overlap the first tongue and extend in the same direction, at least when the tag is attached to fabric. The first tongue preferably extends only part way across the opening in the tag formed in cutting the tongue so that its free end does not abut the opposed edge of the opening, and the second tongue preferably extends beyond said edge so as slightly to overlap the body of the tag beyond the opening. To secure the tag to fabric the margin of the fabric is slipped under one or both of the overlapping tongues and the second tongue is then pressed through the aforesaid opening until its free end snaps behind the aforesaid edge, thereby interlocking the fabric to the tag, with the shorter tongue reinforcing the longer tongue throughout most of the length of the latter in the preferred embodiments of the invention.

In another aspect the invention involves an interlocking portion fastened to one face of the tag for holding a tongue in interlocking relationship with the body of the tag with the fabric held therebetween. The interlocking portion is preferably in the form of a second tongue and it is preferably secured to the face of the tag by cement.

In still another aspect of the invention the aforesaid opening in the tag extends to the fold line between the body of the tag and the tongue extension and the fold line extends only from the opening to each lateral edge of the tag so that, if another tongue is provided in the opening, the two tongues may swing together about the fold line like a butterfly valve.

Further aspects of the invention will be evident from the following description and the accompanying drawings in which, Fig. 1 is a rear view of one embodiment of the invention;
Fig. 2 is a section on the line 2—2 of Fig. 1;
Fig. 3 is a front view of the same embodiment applied to a piece of fabric;
Fig. 4 is a section on line 4—4 of Fig. 3;
Fig. 5 is a front view of another embodiment;
Fig. 6 is a section on line 6—6 of Fig. 5;
Fig. 7 is a front view of another embodiment;
Fig. 8 is a front view of the same embodiment applied to a piece of fabric;
Fig. 9 is a rear view of another embodiment;
Fig. 10 is a rear view of another embodiment;
Fig. 11 is a front view of another embodiment;
Fig. 12 is a section on line 12—12 of Fig. 11;
Fig. 13 is a section on line 13—13 of Fig. 11;
Fig. 14 is a rear view of another embodiment;
Fig. 15 is a front view of the same embodiment;
Fig. 16 is a section on line 16—16 of Fig. 15;
Fig. 17 is a front view of the same embodiment applied to a piece of fabric;
Fig. 18 is a rear view of another embodiment;
Fig. 19 is a section on line 19—19 of Fig. 18;
Fig. 20 is a front view of the same embodiment;
Figs. 21 and 22 are sections of similar embodiments;
Fig. 23 is a rear view of another embodiment;
Fig. 24 is a section on line 24—24 of Fig. 23;
Fig. 25 is a rear view of another embodiment;
Fig. 26 is a section on line 26—26 of Fig. 25;
Fig. 27 is a rear view of another embodiment;
Fig. 28 is a section on line 28—28 of Fig. 27;
Fig. 29 is a section of a similar embodiment;
Fig. 30 is a rear view of another embodiment before the two plies have been wholly applied together;
Fig. 31 is a section on line 31—31 of Fig. 30;
Fig. 32 is a rear view of another embodiment;
Fig. 33 is a section on line 33—33 of Fig. 32;
Fig. 34 is a rear view of another modification;
Fig. 35 is a sectional view of the same modification attached to fabric; and
Fig. 36 is a rear view of a similar modification.

The particular embodiment of the invention illustrated in Figs. 1 to 4 inclusive comprises a body portion 1 extending up to the fold line 2 and having cut therein a tongue 3 extending partially across an opening 4 the ends of which are wider than the central portion below the free end of the tongue 3. Above the fold line 2 is a flap 5, the central portion of which is shaped in the form of a tongue 6. When the flap 5 is folded down about the fold line 2, the tongue 6 overlaps the tongue 3 and projects slightly below the opening 4. To apply the tag to a piece of fabric 7, the fabric is slipped upwardly under both tongues along the left-hand side of the body 1 (Fig. 2) until the edge of the fabric seats in the upper ends of the opening 4 on opposite sides of the tongue 3, whereupon the two tongues are pressed through the opening 4 until the free end of the tongue 6 snaps over the lower edge of the opening 4 in the position illustrated in Figs. 3 and 4. As will be evident from Fig. 4 the tongue 6 serves to hold the parts in interlocked relationship and the tongue 3 serves to reinforce the tongue 6 throughout most of its length.

The modification shown in Figs. 5 and 6 is similar to that shown in Figs. 1 to 4 except in that the flap 5' also includes a portion 8 surrounding the free end of the tongue 6'.

The modification illustrated in Figs. 7 and 8 is like that shown in Figs. 5 and 6 except in that the tongues 9 and 10 are reversed in direction so that when the tag is applied to a piece of fabric 11, as illustrated in Fig. 8, the tag projects beyond the edge of the fabric instead of overlapping the fabric throughout substantially its entire length as illustrated in Fig. 3.

The modification shown in Fig. 9 is like that shown in Figs. 7 and 8 except in that the flap 12 above the fold line 13 has a length equal to that of the body portion 14; and the modification shown in Fig. 10 is like that shown in Fig. 9 except in that the fold line 15 is at the sides instead of the ends of the flap 16 and body 17.

The embodiment shown in Figs. 11, 12 and 13 is in the form of a strip formed by folding a ribbon of tag stock about the longitudinal lines 18 and 19 to form tags of triple thickness. Before the stock is folded tongues are cut in each of the three plies so that, when the plies are folded together, the middle tongue 20 extends beyond the front tongue 21 and the rear tongue 22 projects somewhat beyond the free end of the intermediate tongue 20. This tag is applied to fabric in the manner illustrated in Figs. 3 and 4 except in that the fabric is slipped under three tongues instead of two before the tongues are pressed through to interlocking position. When the tags are in the form of a strip as illustrated in Figs. 11 and 32 they are of course cut apart before being attached to fabric, either by hand or by a machine which not only feeds and cuts the strip but also prints the individual tags either before or after they are cut off.

The modification shown in Figs. 14 to 17 inclusive comprises a body 23 having a tongue 24 extending partially across an opening 25 therein and a flap 26 folded over the face of the tag and cemented thereto as indicated at 27 in Fig. 16. As shown in Figs. 14 and 16 the lower edge of the flap 26 is somewhat below the upper end of the tongue 24 so that the free end of the tongue slightly overlaps the lower edge of the flap 26. To apply this tag to a piece of fabric 28 the margin of the fabric is slipped under the tongue 24 along the rear side of the tag until the edge of the fabric seats in the lower ends of the opening 25, whereupon the tongue 24 is snapped behind the lower edge of the flap 26 to hold the tag on the fabric as illustrated in Fig. 17.

The modification illustrated in Figs. 18 to 20 inclusive is like that shown in Figs. 1 to 4 inclusive except in that the flap 29 is cemented to the rear face of the body 30 along a narrow zone adjacent the fold line as indicated at 31 in Fig. 19.

The embodiment shown in Fig. 21 is like that shown in Figs. 18 to 20 except in that the flap 32 is cemented to the rear face of the body 33 throughout substantially its entire length down to the lower end of the tongue 34, as indicated at 35; and the embodiment shown in Fig. 22 is like that shown in Fig. 21 except in that the tongue 36 is a separate piece of tag stock cemented to the body 37 as indicated at 38.

The modification shown in Figs. 23 and 24 is like that shown in Fig. 22 except in that the longer tongue 39 does not extend throughout the entire width of the body 40 but is confined substantially to the width of the shorter tongue 41.

The modification shown in Figs. 25 and 26 is like that shown in Fig. 21 except in that the cemented flap 42 is constructed like the flap 5' of Figs. 5 and 6, having a portion 43 surrounding the free end of the longer tongue 44.

The modification shown in Figs. 27 and 28 is like that shown in Figs. 25 and 26 except in that the folded flap 45 extends throughout the full length of the body 46, the two parts being cemented together down to the lower end of the shorter flap 47; and the modifications shown in Fig. 29 differs from that shown in Figs. 27 and 28 only in that the two pairs 45' and 46' are cemented together through their lower ends instead of their upper ends, as indicated at 47'.

The embodiment shown in Figs. 30 and 31 is formed of two separate pieces 51 and 52 of the same dimensions, the two plies being cemented together along a narrow zone 53 at the top and also throughout their lower ends as indicated at 54.

The modification shown in Figs. 32 and 33 is like that shown in Figs. 11 to 13 inclusive except in that it comprises two thicknesses instead of three and in that the two plies are cemented together along the edges opposite the folded edge as indicated at 49; as indicated at 50 they may also be cemented adjacent the folded edge.

The tag illustrated in Figs. 34 and 35 comprises a body portion 60 extending up to the fold line 61 and, beyond the fold line, an integral extension terminating in a tongue 62, the extension being reinforced by a patch 63 cemented to the rear face thereof. The body 60 has an opening 64 adjacent the fold line 61 and extending thereto, with a tongue or tab 65 projecting into the opening from the fold line. To apply the tag to fabric 66 the rear face of the tag is placed against the fabric with the edge of the fabric at the fold line 61, the extension is folded rearwardly through 180° and the tongue 62 is then pressed through the opening to the position shown in Fig. 35. By making the distance from the fold line to the tip of the tongue at least approximately equal to, and preferably slightly greater than, the distance from the fold line to the lower edge of the opening, the tongue interlocks the fabric in the opening as previously explained. When the extension is folded as aforesaid the tongue 65 swings with the extension and projects beyond the edge of the fabric. The modification shown in Fig. 36 is like that of Figs. 34 and 35 except in that the tongue 65' fills the opening 64'. As shown in Fig. 36 indicia placed upside down on the back of tongue 65' will be displayed right side up at the front of the tag, beyond the edge of the fabric, when the tag is applied to fabric as described.

By placing both the opening 64 and the tongue 62 at the same end of the tag the tongue will not accidentally pull out of interlocking position when the fabric is pulled taut; and by making the opening large, with long narrow necks of tag material on each side of the opening, the insertion of the tongue is facilitated by stretching the necks as the tongue is pressed through the opening. The tongues 65 and 65' serve as grips for this purpose. The patch 63 or 63' not only reinforces the tongue 62 or 62' but it also serves to define the fold line and to prevent the fold from creeping in use.

Any of the aforesaid modifications may be made in strip form, as illustrated in Figs. 11 and 32. For example, tags such as shown in Figs. 34 and 35 may be integrally joined together side to side in strip form with the extensions 63 projecting along one margin of the strip and with the tongues 62 and openings 64 already cut out and, if desired, with weakened lines between tags to facilitate separation; and tags such as shown in Fig. 36 may be joined together end to end throughout only the width of the tongues 62', either with or without weakened lines at the ends of the tongues. When the tags are thus made in strip form they may be printed by feeding the strip through a printing machine and if desired the machine may be arranged not only to print the tags but also to separate them and affix them to goods. The tags may be fed through the printing machine by engagement with notches in the margin of the strip, with the openings above described or with feed openings at the junctions between adjacent tags. However, the machine and automatic methods of attachment constitute subject-matter for another patent to be applied for later.

It should be understood that while reinforcing patches have been shown on only a few of the modifications they may be used in any embodiment of the invention.

When the rear portion of the tag is formed from a separate piece of material, as illustrated in Figs. 22, 23, 24, 30 and 31, it may be formed of different material. For example, the rear ply may be formed of fiber stock and the front ply of ordinary cardboard stock. In the other examples the one-piece tag may be formed of any type of stock which has sufficient rigidity to afford interlocking tongues of sufficient strength and which has a suitable surface on its front side to receive writing or printing.

When the rear portion of the tag extends the full length of the body portion and is not cemented thereto below the tongues, as illustrated in Figs. 9, 10, 11 to 13, 27 and 28, the front face of the rear portion may carry indicia in addition to that applied to the front face of the body portion of the tag.

In each embodiment of the invention the shorter tongue cut in the body of the tag is preferably spaced from the surrounding edge of the body throughout its entire periphery so that it has no interlocking action when the tag is affixed to fabric, the longer tongue serving to anchor the fabric in the tag and the shorter tongue serving merely to reinforce the longer tongue so that the latter will not bend or break after the tag is affixed. By spacing the shorter tongue from the surrounding edge of the body throughout its entire periphery, the tongues may be more easily moved into interlocking position in affixing the tag to fabric, with less danger of permanently deforming the tongues, and the shorter tongue thereafter reinforces the longer tongue substantially as much as if the shorter tongue were as long as the other. For the same reasons it is also preferred not to cement the two tongues together, even when adjacent parts are cemented.

In each embodiment of the invention the face of the tongue which contacts with the fabric may be coated with a suitable adhesive, preferably a dry coating which becomes adhesive when moistened, thereby to anchor the tag more firmly to the fabric, the coating preferably being moistened automatically by the machine which applies the tag to the fabric. Such a coating is illustrated at 70 in Figs. 27 and 28 and is particularly applicable to tags for use on thin fabrics where there is a greater tendency for the tags to become detached accidentally.

It should be understood that the present disclosure is for the purpose of illustration only and that this invention includes all modifications and equivalents which fall within the scope of the appended claims.

I claim:

1. A tag having an opening therein with two portions of the tag disposed on two opposite sides of the opening respectively, tongue means having free ends for anchoring fabric in the opening, said means comprising two fabric-retaining thicknesses of material cemented together and fast to one of said portions and long enough to extend across the opening with free ends in juxtaposition to the edge of said other portion, said free ends being substantially narrower than the opening to provide substantial clearance spaces on each side of the ends so that with fabric between the ends and the body of the tag both ends may be pressed through the opening with the fabric extending through said clearance spaces, and one of said ends overlapping said edge so that the fabric is interlocked between the end and edge when the ends are pressed through the opening as aforesaid.

2. A tag having an opening therein with two portions of the tag disposed on two opposite sides of the opening respectively, tongue means having free ends for anchoring fabric in the opening, said means comprising two fabric-retaining thicknesses of material fast to one of said portions and long enough to extend across the opening with free ends in juxtaposition to the edge of said other portion, said free ends being substantially narrower than the opening to provide substantial clearance spaces on each side of the ends so that with fabric between the ends and the body of the tag both ends may be pressed through the opening with the fabric extending through said clearance spaces, one of said ends extending at least substantially to said edge so that the fabric is interlocked between the end and edge when the ends are pressed through the opening as aforesaid, one of said thicknesses comprising an integral extension of the tag folded over said opening along a fold line and the other thickness being cemented to the first thickness and extending to said line thereby to define the fold line.

3. A tag having an opening therein and first and second tongues for anchoring fabric in the opening, parts of the tag including said tongues overlapping each other and certain areas of the overlapping parts being cemented together, the free ends of the tongues being substantially narrower than the opening to provide substantial clearance at the sides of the tongues so that with fabric between the tongues and the body of the tag both tongues may be pressed through the opening with the fabric extending through said clearance spaces, said first tongue being long enough to overlap the edge of the opening so that the fabric is interlocked between said edge and the end of the tongue when the tongues are pressed through the opening, and said second tongue being too short to overlap said edge, the second tongue lying between the fabric and the first tongue when the tag is applied to the fabric to reinforce the first interlocking tongue.

4. A tag having an opening therein and first and second tongues for anchoring fabric in the opening, parts of the tag including said tongues overlapping each other and certain areas of the overlapping parts being cemented together, the tongues being uncemented, the free ends of the tongues being substantially narrower than the opening to provide substantial clearance at the sides of the tongues so that with fabric between the tongues and the body of the tag both tongues may be pressed through the opening with the fabric extending through said clearance spaces, said first tongue being long enough to overlap the edge of the opening so that the fabric is interlocked between said edge and the end of the tongue when the tongues are pressed through the opening, and said second tongue being too short to overlap said edge, the second tongue lying between the fabric and the first tongue when the tag is applied to the fabric to reinforce the first interlocking tongue.

5. A tag comprising two overlapping portions cemented together face to face, one portion being cut out to form an opening with an integral tongue extending from one side of the opening toward the opposite edge of the opening, the other portion comprising a second tongue which overlaps the first tongue, the tongues being substantially narrower than the opening to provide substantial clearance at the sides of the tongues so that with fabric between the tongues and the tag both tongues may be pressed through the opening with the fabric extending through said clearance spaces, said second tongue being long enough to overlap said edge so that the fabric is interlocked between said edge and the end of the tongue when the tongues are pressed through the opening, said first tongue being too short to overlap said edge and the first tongue lying between the fabric and the second tongue when the tag is applied to the fabric to reinforce the second interlocking tongue.

6. A tag having an opening therein with two portions of the tag disposed on two opposite sides of the opening respectively, tongue means having free ends for anchoring fabric in the opening, said means comprising two fabric-retaining thicknesses of material fast to one of said portions and long enough to extend over the opening with said free ends in juxtaposition to an edge of said other portion, said free ends being substantially narrower than the opening to provide substantial clearance spaces on each side of the ends so that with fabric between the ends and the body of the tag both ends may be pressed through the opening with the fabric extending through said clearance spaces, one of said ends overlapping said edge so that the fabric is interlocked between the end and edge when the ends are pressed through the opening as aforesaid, one of said thicknesses comprising an integral extension of the tag folded over said opening along a fold line and the other thickness being cemented to the first thickness and extending to said line thereby to define the fold line.

CARL A. FLOOD.